United States Patent [19]

Keast et al.

[11] 4,246,809

[45] Jan. 27, 1981

[54] POWER TONG APPARATUS FOR MAKING AND BREAKING CONNECTIONS BETWEEN LENGTHS OF SMALL DIAMETER TUBING

[75] Inventors: Larry G. Keast, Houston, Tex.; Herbert D. Horton, Mayhill, N. Mex.

[73] Assignee: World Wide Oil Tools, Inc., Houston, Tex.

[21] Appl. No.: 82,873

[22] Filed: Oct. 9, 1979

[51] Int. Cl.$^3$ .............................................. B25B 17/00
[52] U.S. Cl. ................................. 81/57.16; 81/57.18
[58] Field of Search ................... 81/57.16, 57.18, 57.2, 81/57.34

[56] References Cited

U.S. PATENT DOCUMENTS

| | | | |
|---|---|---|---|
| 2,371,562 | 3/1945 | Kelley | 81/57.18 |
| 3,180,186 | 4/1965 | Catland | 81/57.18 |
| 3,261,241 | 7/1966 | Catland | 81/57.18 |
| 3,507,174 | 4/1970 | Dickmann | 81/57.18 |

Primary Examiner—James L. Jones, Jr.
Attorney, Agent, or Firm—Vinson & Elkins

[57] ABSTRACT

An improved power tong apparatus for making and breaking connections between lengths of small diameter tubing comprising an annular cage mounted for rotation and on which are pivotally mounted a plurality of pipe-gripping rocker arms, an annular bull gear mounted for rotation in association with the annular cage and having internally positioned rollers mounted in association with the pivotally mounted pipe-gripping rocker arms, and an endless chain assembly or gear for rotating the bull gear, and a slot and pin assembly for restricting the movement of the bull gear with respect to the annular cage for causing the pipe-gripping rocker arms to be movable into an open position to release their grip on the pipe.

2 Claims, 8 Drawing Figures

POWER TONG APPARATUS FOR MAKING AND BREAKING CONNECTIONS BETWEEN LENGTHS OF SMALL DIAMETER TUBING

BACKGROUND OF THE INVENTION

The present invention relates to a power tong apparatus for making and breaking threaded connections between lengths of small diameter tubing. Make-and-break apparatus have long been used in the oil and gas producing industry to grip and rotate lengths of well pipe during the making up or breaking out of joints of such pipe. Make-and-break apparatus usually comprise two tongs operating in conjunction with each other: a backup tong which serves to grip and hold stationary the length of pipe which extends into the well and a power tong which serves to grip and rotate the length of pipe which is suspended in the derrick above the well. In operation the backup tong prevents the lower length of pipe from being rotated while the upper length of pipe is being screwed into or unscrewed from the lower length of pipe by the rotating power tong.

Power tongs may be of either the "open" head type or the "closed" head type. The "open" head type power tong possesses a hinged bull gear and gate in the side of the structure enclosing the pipe which opens to permit the power tong to encircle the pipe from the side. The hinged bull gear closes upon the pipe once the power tong has been placed around the pipe. The "closed" head type power tong possesses no side openings. It is generally in the form of a ring through which the pipe ends must be inserted and through which the pipe lengths must be guided.

Power tongs may be designated to rotate pipe in only one direction or may be designed to rotate pipe in either of two directions. Power tongs capable of bi-directional rotation permit the threaded ends of the pipe to be screwed together and then unscrewed without turning over the power tong. A power tong capable of rotating pipe in only one direction would need to be turned over to rotate the pipe in the opposite direction.

Closed head type power tongs capable of bi-directional rotation in many instances require a manual change of pipe gripping elements in order to reverse the direction of rotation. This requires removal of the cover of the power tong, the removal, inversion and replacement of each pipe gripping element in the power tong and replacement of the cover of the power tong.

While many types of power tongs have been developed over the years, the designs of these power tongs have been directed primarily toward the larger types of well pipe, such as tubing, casing, and drill pipe larger than 2⅜" O.D. The design of the present invention is concerned with a power tong adapted for use on very small diameter pipe 1.660 inch outer diameter or smaller). Such small diameter pipe is generally referred to in the oil and gas producing industry as macaroni tubing and is typically used in snubbing and hydraulic workover operations.

The small diameter of such macaroni tubing presents practical problems in designing a power tong to supply the appropriate amount of gripping force and torque. The relatively small surface area of the tubing presents a very limited area with which the gripping means of the power tong can make contact. Also, the small diameter of the tubing provides a very short radius or lever arm to provide torque. Care must be taken that the gripping strength of the power tong is not concentrated on too few points on the tubing. Otherwise, the relatively low rigidity and strength of the thin walled tubing will be overcome and the tubing will bend, buckle or otherwise deform. While meeting this requirement, the power tong must be able to apply sufficient torque to screw and unscrew very small diameter tubing without slipping and damaging the pipe.

SUMMARY

An object of the present invention is to provide a make-and-break apparatus comprising a power driven, bi-directional, rotary, closed head type power tong and a backup tong, both of which are specially designed and adapted for gripping and working with very small diameter pipe known as tubing.

An additional object of the present invention is to provide a make-and-break apparatus which includes automatically reversible pipe gripping means which can reverse the direction of rotation of the pipe without requiring the removal of the power tong cover to invert each pipe gripping element in the power tong.

The make-and-break apparatus of the present invention comprises a ring-shaped closed head type automatically reversible power tong for gripping and rotating small diameter pipe either clockwise or counterclockwise during the screwing or unscrewing of pipe joints and a ring-shaped closed head type automatically reversible backup tong for gripping and holding such small diameter pipe against the rotational forces acting on the pipe during the screwing or unscrewing of pipe joints. The mechanism for applying backup torque to the backup power tong may be controlled by the same motive means that operates the pipe-rotating power tong. This arrangement causes backup torque to be automatically applied whenever torque is applied to the pipe-rotating power tong.

The pipe gripping means in the pipe-rotating power tong comprises an annular cage mounted for rotation on which are pivotally mounted a plurality of pipe-gripping rocker arms, an annular bull gear mounted for rotation in association with the annular cage having internally positioned rollers mounted in association with the pivotally mounted pipe-gripping rocker arms, an endless chain assembly or gear for rotating the bull gear, and a slot and pin assembly for restricting the movement of the bull gear with respect to the annular cage for causing the pipe-gripping rocker arms to be movable into an open position to release their grip on the pipe.

The pipe-gripping means in the backup tong comprises an annular cage mounted for rotation on which are pivotally mounted a plurality of pipe-gripping rocker arms, annular bull gear mounted for rotation in association with the annular cage having internally positioned rollers mounted in association with the pivotally mounted pipe-gripping arms, and motive means for imparting sufficient rotary motion to the annular cage to cause the rollers to contact the pipe-gripping rocker arms and thereby cause the arms to engage the pipe.

Other objects and advantages of the invention will be hereinafter described or will become apparent to those skilled in the art, and the novel features of the invention will be defined in the appended claims.

DESCRIPTION OF THE PREFERRED EMBODIMENT

Figure 1:
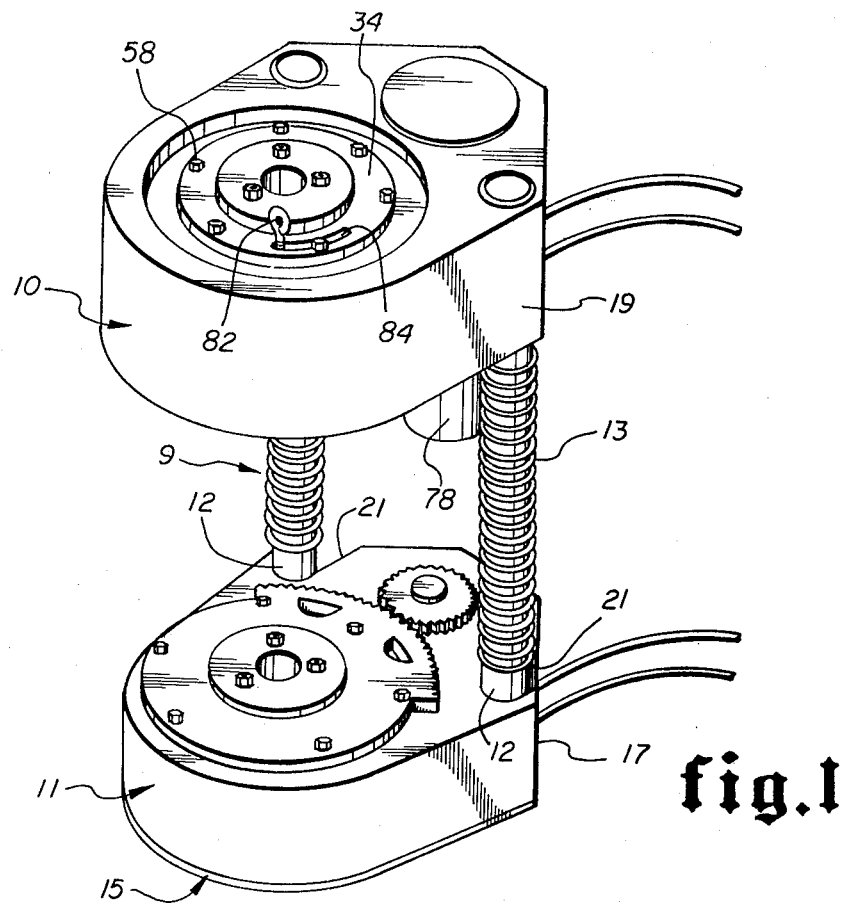
FIG. 1 is a perspective view of the make-and-break apparatus comprising a pipe-rotating power tong and a backup tong.
Figure 2:
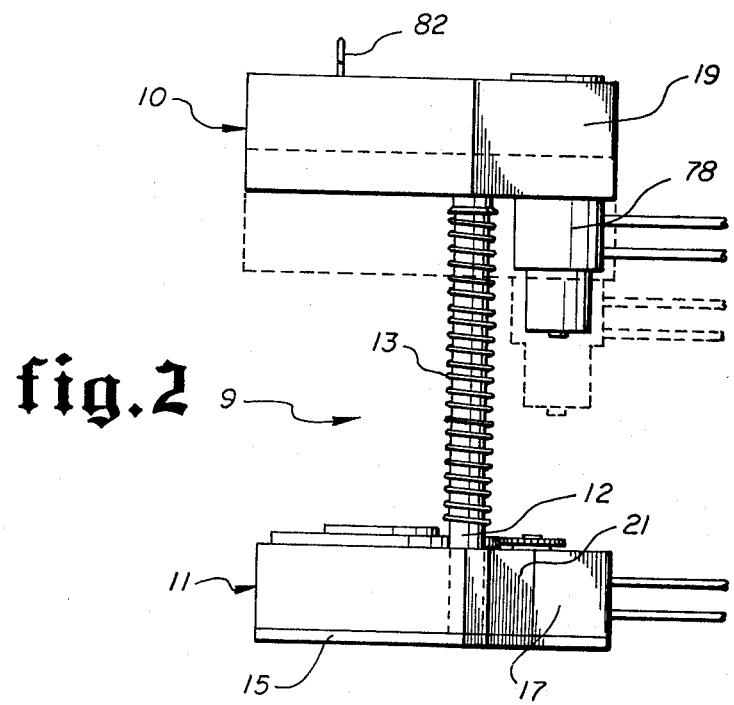
FIG. 2 is a side view of the make-and-break apparatus showing the movement of the pipe-rotating power tong with respect to the backup tong.

The presently preferred embodiment of the present invention is shown in FIGS. 1-8. The preferred embodiment of the make-and-break apparatus, referred to generally by the number 9, comprises, as shown in FIGS. 1 and 2, a pipe-rotating power tong, referred to generally by the number 10, and a backup tong, referred to generally by the number 11. Preferably the pipe-rotating power tong 10 and the backup tong 11 are mounted for longitudinal movement with respect to each other by means of heavy steel rods 12 or the like having springs or other force means 13 mounted in association therewith to allow movement between the two tong units during thread makeup and breakout, as is well known to those skilled in the art. When the make-and-break apparatus is used in a vertical mode to make or break joints in a vertically oriented string of pipe, the housing 17 containing the backup tong 11 preferably rests upon and is removably secured to support base 15 as shown in FIGS. 1 and 2. Support base 15 preferably constitutes the support for the apparatus and rods 12 function as legs supporting the housing 19 for the pipe-rotating power tong unit 10. The pipe-rotating power tong unit 10 may ride up and down on the supporting springs 13 and the rods 12 as shown by the dotted outline in FIG. 2.

Figure 6:
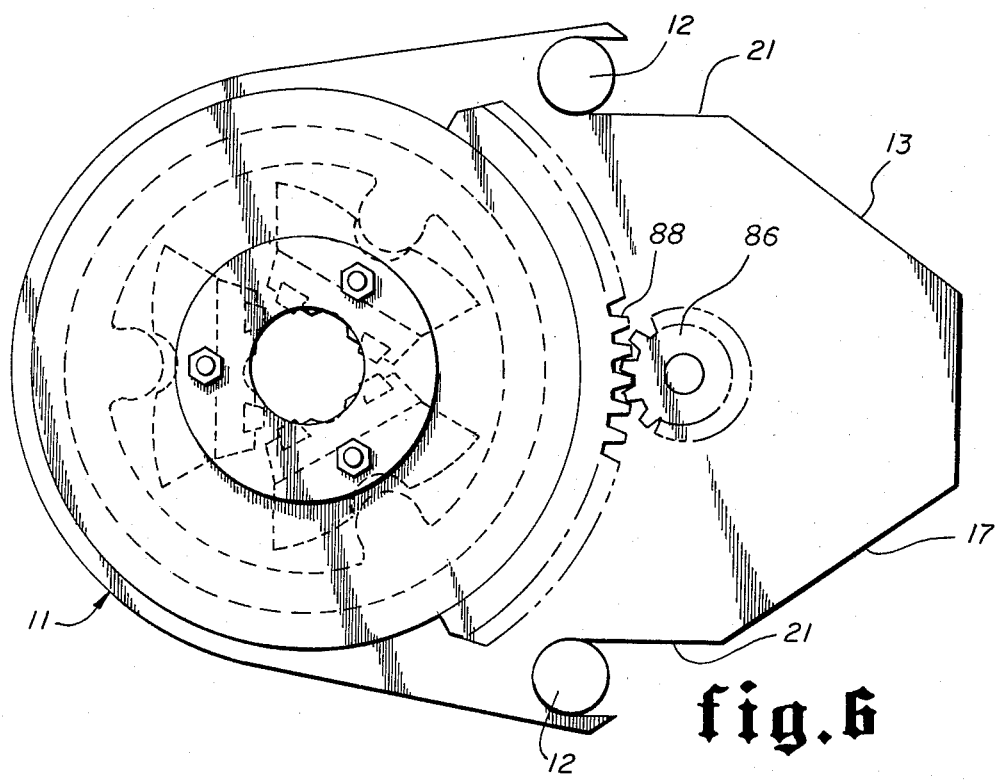
FIG. 6 is a top plan view of the backup tong with the upper cage plate removed.

The backup tong 11 may be removed from its position on support base 15 by simply unfastening the means (not shown) for securing housing 17 to support base 15 and by sliding housing 17 out from around rods 12 which slidably fit within slots 21 of housing 17 as shown in FIGS. 1 and 6.

As noted, pipe-rotating power tong unit 10 is enclosed within a structural frame or housing 19. One end of housing 19 has approximately the shape of a right circular cylinder in order to enclose and support the various elements of the circularly shaped pipe-rotating power tong 10. The other end of housing 19 is longitudinally extended in the plane perpendicular to the axis of rotation of the power tong 10, said extension in said plane having approximately the shape of a truncated triangle in order to enclose and support the endless chain for rotating the power tong unit and to support the motor and the drive sprocket for driving the endless chain, all of which will be hereinafter described.

Figure 3:
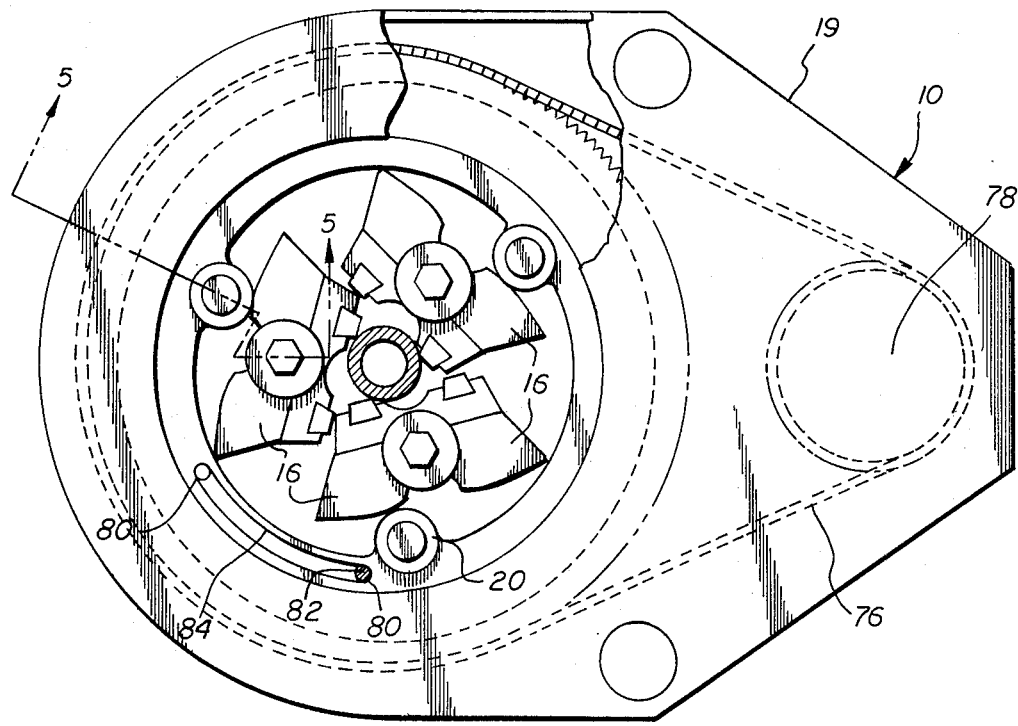
FIG. 3 is a top plan view of the pipe-rotating power tong with the upper cage plate removed showing the position of the various portions of the tong during clockwise rotation of the pipe.
Figure 4:
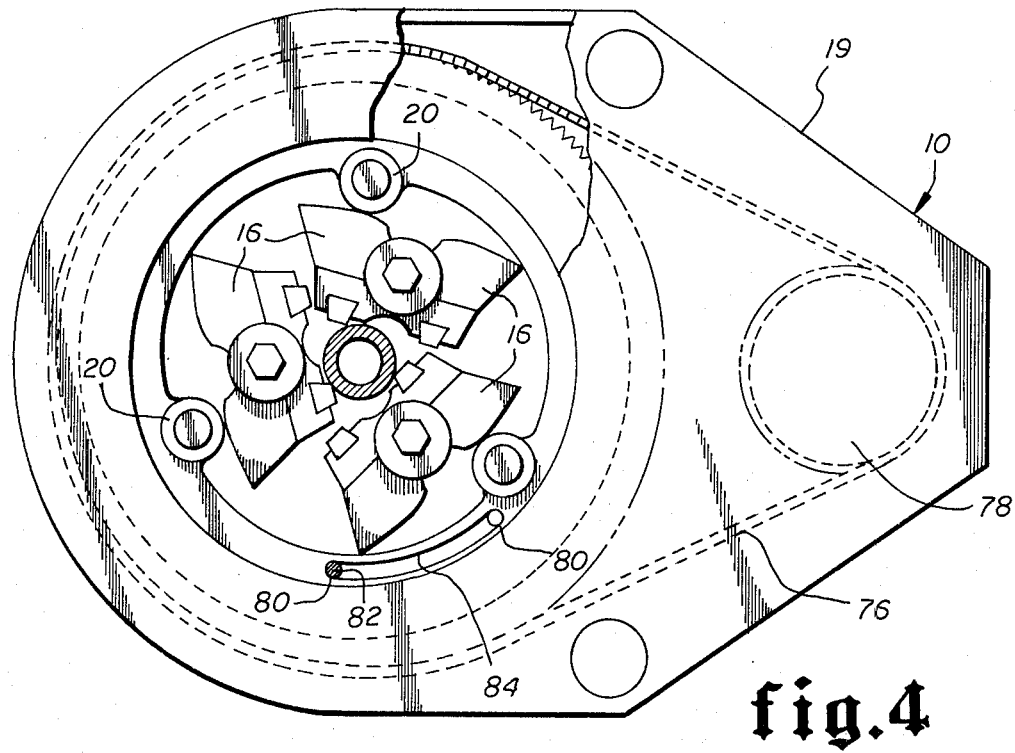
FIG. 4 is a top plan view of the pipe-rotating power tong with the upper cage plate removed showing the position of the various portions of the tong during counterclockwise rotation of the pipe.
Figure 5:
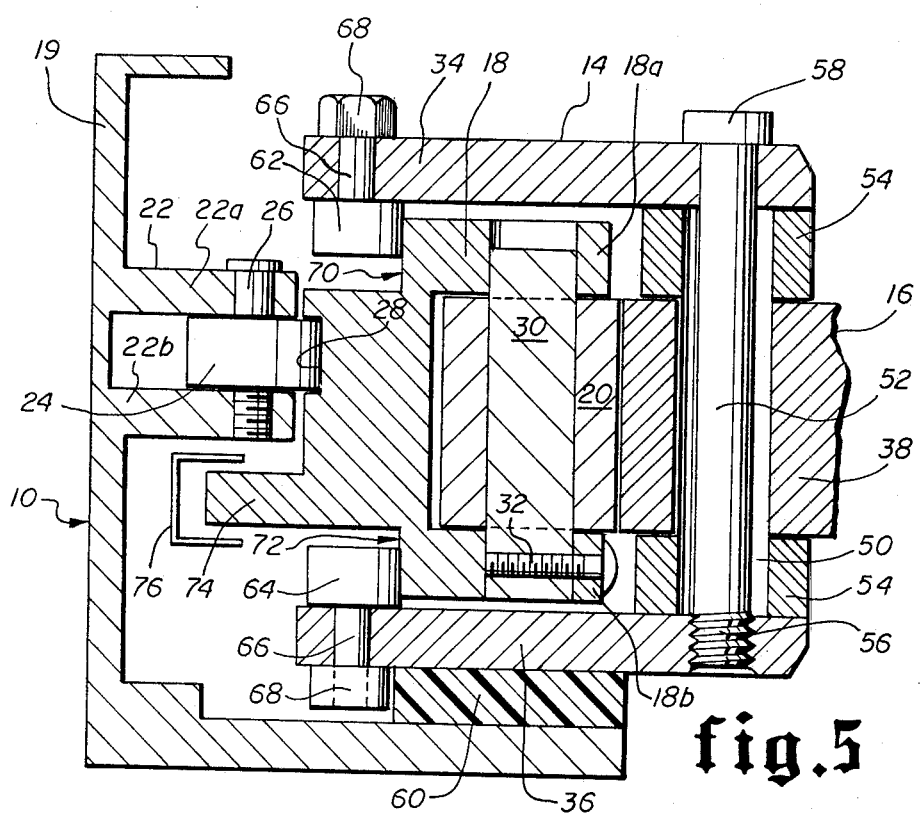
FIG. 5 is a partial longitudinal cross-sectional view of the pipe-rotating power tong as shown in FIG. 3 taken along the line 5—5 thereof, but with the upper cage plate in place.

As shown in particularly in FIGS. 3 and 4, the pipe rotating portion of the power tong 10 generally comprises an annular cage 14 mounted for rotation within housing 19, a plurality of pipe-gripping rocker arms 16, an annular rotatable bull gear 18 mounted in association with the annular cage 14, and internally positioned concentric camming rollers 20 mounted on the bull gear 18 in association with one of the rocker arms 6 mounted on the annular cage 14. As shown in FIG. 5, a plurality of stud mounted roller supports 22 are attached to internal portions of the housing 19 and disposed around and adjacent to the circular circumference of bull gear 18. Each stud mounted roller support 22 possesses an upper support arm 22a and a lower support arm 22b which, in conjunction, form a cavity adapted to receive a stud mounted roller 24. Each stud mounted roller 24 is rotatably secured to the stud mounted roller support 22 by a roller support stud 26. The edge of each stud mounted roller 24 which is closest to the bull gear 18 fits inside a rectangularly shaped bull gear shaped groove 28 which is cut in the outer circumference of the bull gear 18. In this manner, the bull gear 18 is circumferentially supported within the housing 19 and is free to rotate either clockwise or counterclockwise on the stud mounted rollers 24.

As shown in FIGS. 3 and 4, bull gear 18 has the general shape of a hollow right circular cylinder. The upper and lower edges of the generally cylindrical interior walls of bull gear 18 extend inwardly toward the axis of rotation of the power tong unit at a number of points to accommodate the concentrically arranged camming rollers 20. At those points where the camming rollers 20 are located, the upper portion of the adjacent interior surface of the bull gear 18 extends inwardly and forms an upper camming roller support arm 18a. Similarly, the lower adjacent interior surface of the bull gear 18 at those points extends inwardly to form a lower camming roller support arm 18b. The camming roller support arms 18a and 18b in conjunction with the main body of the bull gear 18, form a cavity generally disposed to receive a camming roller 20 of a right circular cylindrical shape. Each camming roller support arm 18a and 18b possesses a cylindrical shaped aperture along the axis of rotation of camming roller 20 through which a camming roller pin 30 may pass. Each camming roller 20 also possesses a cylindrical shaped aperture along the axis of rotation of the camming roller 20 through which the camming roller pin 30 may pass. Each camming roller 20 is mounted to the bull gear 18 by placing the camming roller 20 in the cavity formed by the upper camming roller arm 18a and the lower camming roller 18b and the main body of the bull gear 18 and by passing camming roller pin 30 through the aforesaid apertures. The camming roller pin 30 is fastened the bull gear 18 with a camming roller pin bolt 32.

As shown in FIG. 5, camming roller pin bolt 32 passes through an aperture cut in the outer edge of lower camming roller support arm 18b and passes through an aperture cut in the lower portion of camming roller pin 30. Camming roller pin bolt 30 threadedly engages and secures camming roller pin 30 to bull gear 18 within the enclosure formed by camming roller support arms 18a and 18b. The fixed position of camming roller pin 30 with respect to bull gear 18 permits camming rollers 20 to rotate freely either clockwise or counterclockwise.

The bull gear 18 with attached camming rollers 20 mounted as described is mounted for rotation in association with an annular cage generally denoted 14 comprising an upper cage plate 34, a lower cage plate 36 and the plurality of rocker arms 16 pivotally connected between said upper cage plate 34 and said lower cage plate 36.

Figure 7:
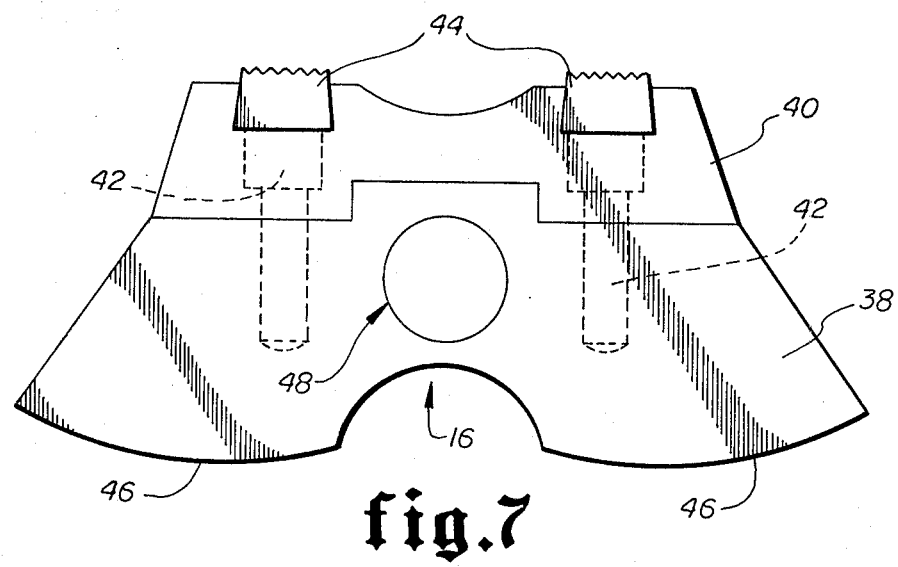
FIG. 7 is a top plan view of one of the pivotally mounted pipe-gripping rocker arms.

In the present embodiment of the invention, each rocker arm 16 is generally constructed as shown in FIG. 7. Each rocker arm comprises a rocker arm body 38, a rocker arm jaw 40, two rocker arm jaw bolts 42 for attaching the rocker arm jaw 40 to the rocker arm body 38, and two pipe-gripping rocker arm dies 44. The rocker arm 16 lies horizontally in the plane of rotation of the power tong 10 with the pipe-gripping rocker arm dies 44 toward the pipe to be gripped. The surface of the rocker arm body 38 adjacent to the interior surface of the bull gear 18 is referred to as the rocker arm camming surface 46. The central portion of the rocker arm camming surface 16 is indented in a semi-circular fashion so that the rocker arm body 38 may co-operate with and receive the camming roller 20. This cooperation effects a detenting action which, when the rocker arm 16 is in its center, or open, position, positively retains the rocker arm 16 in this position out of engagement with the pipe. The outer portions of the rocker arm camming surface 46 are shaped so that the camming roller 20 will wedge against the rocker arm camming surface 46 when the camming roller 20 is moved laterally with respect to the central portion of the rocker arm camming surface 46.

Such wedging or camming action is enabled by the pivotal connection of the rocker arm 16 between the upper cage plate 34 and the lower cage plate 36 of the annular cage 14. The central portion of the rocker arm body 38 possesses a cylindrically shaped rocker arm pivot aperture 48 which passes vertically through the rocker arm body 38 along the axis about which the rocker arm 16 horizontally pivots. The rocker arm pivot aperture 48 receives and holds a hollow cylindrical rocker arm pin sleeve 50 which, in turn, receives and holds a cylindrical rocker arm pin 52.

As shown in FIG. 5, rocker arm body 38 rests upon and is supported by a rocker arm collar 54 which possesses the general shape of a hollow right circular cylinder. The cylindrically shaped aperture of rocker arm collar 54 is just large enough to accommodate rocker arm pin sleeve 50. The rocker arm collar 54 rests upon the lower cage plate 36 while a separate rocker arm collar 54 of identical construction rests upon the top of rocker arm body 38. During the assembly of the annular cage 14 each of the aforementioned elements of each of the rocker arm assemblies is aligned as shown in FIG. 5 so that the rocker arm pin sleeve 50 may be passed through the cylindrically shaped rocker arm pivot aperture 48 of rocker arm body 38 and through the corresponding apertures of the two aforementioned rocker arm collars 54. Once the rocker arm pin sleeve 50 has been so inserted, the upper cage plate 34 of the annular cage 14 is placed upon the topmost rocker arm collars 54 and aligned so that the rocker arm pin apertures in upper cage plate 34 are in alignment with the aforementioned apertures and are in alignment with the rocker pin apertures in lower cage plate 36.

Once the rocker pin apertures are in alignment, a rocker arm pin 52 is inserted through the upper cage plate 34 and through the rocker arm pin sleeve 50 for each rocker arm 16. Each rocker arm pin 52 is formed with threaded ends 56 on the lowermost end of the pin and is formed with a bolt-shaped head 58 on the uppermost end of the pin. During the assembly process each rocker arm pin 52 is turned so that the threaded ends 56 of each rocker arm pin 52 engages the threads of each of the respective apertures in the lower cage plate 36. Each rocker arm pin 52 is thus secured to the lower cage plate 36, thereby clamping together the various portions of annular cage 14.

Turning now to the interaction between annular cage 14 and bull gear 18, it is noted that annular cage 14, when assembled as described above, is assembled around bull gear 18. That is, lower cage plate 36 is first placed and positioned upon drag brake 60 which rests on the bottom of housing 19. The operation of drag brake 60 will be discussed more fully below. After lower cage plate 36 is in position within housing 19, bull gear 18 is mounted upon the aforementioned stud mounted roller supports 22. Then the previously described assembly of the rocker arms 16 is carried out. Lastly, upper cage plate 34 is assembled as described above enclosing bull gear 18 between cage plates 34 and 36.

To facilitate the rotation of the bull gear 18 and the annular cage 14 with respect to each other, especially when the direction of rotation of the power tong is being changed, the upper and lower cage plates 34 and 36 are provided with a plurality of upper bull gear rollers 62 and lower bull gear rollers 64 as shown in FIG. 5. Upper bull gear rollers 62 have the general shape of hollow right circular cylinders and are attached to the underside of the outer edge of upper cage plate 34. Lower bull gear rollers 64 are of the same construction as upper bull gear rollers 62 but are attached at the outer edge of the top of lower cage plate 36. Both upper bull gear rollers 62 and lower bull gear rollers 64 are attached to their respective cage plates, 34 or 36, by passing a bull gear roller bolt 66 through the cylindrical aperture cut along the axis of said bull gear roller, 62 or 64, passing said bolt 66 through the cylindrical aperture cut through the edge of the respective cage plate, 34 or 36, and by threadably securing the end of said bolt 66 with a bull gear roller nut 68.

As shown in FIG. 5, a right-angled upper bull gear roller groove 70 is cut into bull gear 18 along and around the circumference of the upper outer edge of said bull gear 18. Said groove 70 receives and cooperates with all of the upper bull gear rollers 62 circumferentially placed underneath the outer edge of upper cage plate 34. Each upper bull gear roller 62 is in contact with the interior vertical face of upper bull gear roller groove 70. Said rollers 62 aid in centering bull gear 18 within annular cage 14. Also as shown in FIG. 5, a similar rightangled lower bull gear roller groove 72 is cut into the circumference of the lower outer edge of bull gear 18 to receive and cooperate with the lower bull gear rollers 64. The lower bull gear rollers 64 serve the same aforesaid purpose as the upper bull gear rollers 62.

Drag brake 60 has the form of a flat right circular annulus. As shown in FIG. 5, drag brake 60 rests upon and is fastened to the interior surface of the bottom of housing 19. Lower cage plate 36 of annular cage 14 is in contact with drag brake 60. After lower cage plate 36 is assembled into annular cage 14 as described above, lower cage plate 36 is supported by the stud mounted rollers 24 via the support such rollers provide to bull gear 18. That is, if drag brake 60 were not present, then lower cage plate 36 would remain suspended above the interior surface of the bottom of housing 19. The height of drag brake 60 is sufficient to cause the top of drag brake 60 to contact the bottom of lower cage plate 36 with sufficient force to hold stationary lower cage plate 36 and annular cage 14 when small amounts of torque are applied to rotate annular cage 14. When sufficient torque is supplied to overcome the moderate amount of friction between drag brake 60 and lower cage plate 36, lower cage plate 36 turns freely. The purpose of the drag brake 60 is to hold stationary the annular cage 14 and the rocker arms 16 when the bull gear 18 and camming rollers 20 start to move until the camming rollers 20 have wedged the rocker arms 16 into the pipe to be gripped. In an alternate embodiment of the invention, the drag brake may assume the form of a restraining band frictionally contacting the circumference of one of the cage plates, 34 or 36, of annular cage 14.

A plurality of sprocket teeth 74 are attached to the outer surface of bull gear 18 immediately above the lower bull gear roller groove 72. The sprocket teeth 74 are uniformly spaced around the circumference of bull gear 18 and are adapted to fit between the links of an endless chain 76 which is secured around the bull gear 18 and similar sprocket teeth (not shown) mounted on a motive means 78 secured in the housing 13. The chain 76 may be moved in either direction along its length by the motor 78 and may impart rotary force to the bull gear 18 via sprocket teeth 74 to rotate the bull gear 18 either clockwise or counterclockwise.

As shown in FIGS. 1 and 3, the upper surface of bull gear 18 possesses two motion restraining pin holes 80. Each pin hole 80 is adapted to receive a motion restraining pin 82. In the preferred embodiment of the invention, the pin holes 80 are drilled in the upper surface of bull gear 18 between two of the camming rollers 20. The distance along the circumference of the upper surface of bull gear 18 from one pin hole 80 to the other pin hole 80 depends upon the amount of rotation needed to move the rocker from camming position to open position, as will be more fully described below.

An arcuate slot 84 is cut in upper cage plate 34. Said slot 84 is of sufficient width to accommodate motion restraining pin 82 while said pin 82 rests in either of the motion restraining pin holes 80. The length of said arcuate slot 84 is equal to and follows the shape of the circumferential distance along the upper surface of bull gear 18 from one pin hole 80 to the other pin hole 80. Motion restraining pin holes 80 are drilled in bull gear 18 and arcuate slot 84 is cut in upper cage plate 34 so that the pin holes 80 rest just inside the ends of the slot 84 when the pin holes 80 rest just inside the ends of the slot 84 when the camming rollers 20 are aligned with the semi-circular indentations of rocker arm camming surfaces 46.

The function of the motion restraining pin holes 80, the motion restraining pin 82 and the arcuate slot 84 is to prevent the movement of the bull gear 18 with respect to the annular cage 14 from exceeding a certain magnitude. For example, assume that the pipe being rotated by the power tong has been rotated in the clockwise direction and it is now desired to reverse the motor 78 and rotate the pipe in the counterclockwise direction. During the initial application of clockwise torque the annular cage 14 including upper cage plate 34 with arcuate slot 84 does not move until the rocker arms 16 have been cammed into the pipe by camming rollers 20. However, before annular cage 14 moves, bull gear 18 has moved clockwise a small amount with respect to annular cage 14. This movement causes the leading motion restraining pin hole 80 to be covered by the initially stationary upper cage plate 34 of annular cage 14. After annular cage 14 begins to move clockwise after rocker arms 16 are fully cammed by the camming rollers 20 of bull gear 18, annular cage 14 and arcuate slot 84 of upper cage plate 34 do not move with respect to bull gear 18 and the motion restraining pin hole 80 covered by upper cage plate 34 remains covered.

Because the amount of relative motion possible between bull gear 18 and annular cage 14 is less than the circumferential distance between the motion restraining pin holes 80, one such pin hole 80 remains uncovered and visible through arcuate slot 84 when the first pin hole 80 is covered by upper cage plate 14. The width of arcuate slot 84 permits motion restraining pin 82 to be inserted in the uncovered pin hole 80 through arcuate slot 84.

Assume that after the power tong has fully rotated the pipe in a clockwise direction as described above, it is desired to release the power tong's grip on the pipe. The motion restraining pin 82 is in the motion restraining pin hole 80 visible through arcuate slot 84. The operator then causes the motor 78 to revolve the bull gear 18 in the opposite (counterclockwise) direction. As bull gear 18 moves counterclockwise with respect to annular cage 14, the camming rollers 20 return to the respective central portions of the rocker arm camming surfaces 46 of the rocker arms 16 and cause the rocker arms 16 to move away from the pipe and assume the non-gripping position of being out of contact with the pipe.

At that point, the camming rollers 20 are aligned with the respective semi-circular indentations of the rocker arm camming surfaces 46. Also at that point, the motion restraining pin 82 has moved far enough through arcuate slot 84 to strike the edge of the end of the slot 84 and halt the reverse movement of bull gear 18 with respect to annular cage 14. If motion restraining pin 82 had not been placed in the aforementioned motion restraining pin hole 80, bull gear 18 would have continued to rotate counterclockwise and cause the rocker arms 16 to grip and rotate the pipe in a counterclockwise direction. The aforementioned pin and slot arrangements for releasing the gripping action of the rocker arms 16 eliminates the necessity for springs and other devices commonly used to move gripping devices out of the way of the pipe.

Turning now to the construction of the backup tong, one notes that the basic construction is almost identical to that of the pipe-rotating power tong described above. As shown in FIGS. 1 and 2, the backup tong unit 11 is enclosed within a housing 17. While the pipe-gripping mechanism mounted within said housing 17 is identical in construction to that mounted in housing 19 of the pipe-rotating power tong unit 10, the motive means for causing the pipe-gripping mechanism to grip the pipe is different. This difference is due to the fact that the backup tong 11 need only grip the pipe and hold it stationary against rotation imparted by the pipe-rotating power tong. There is no need for the backup tong unit 11 to rotate the pipe. Accordingly, the mechanism of the backup tong unit 11 is designed to rotate in either the clockwise or counterclockwise direction only far enough as is necessary to engage the pipe-gripping rocker arms against the pipe.

In the preferred embodiment of the invention as illustrated in FIG. 6, a motive means (not shown) drives a gear 86 for engaging and rotating an arcuate toothed rack 88 which is an extension of the upper cage plate 34 of the annular cage 14 of the back-up power tong 11. Rotation of gear 86 imparts rotary motion to said annular cage 14 via said arcuate toothed rack 88, thereby causing the pipe-gripping rocker arms 16 mounted on said annular cage 14 to grip the pipe.

Figure 8:
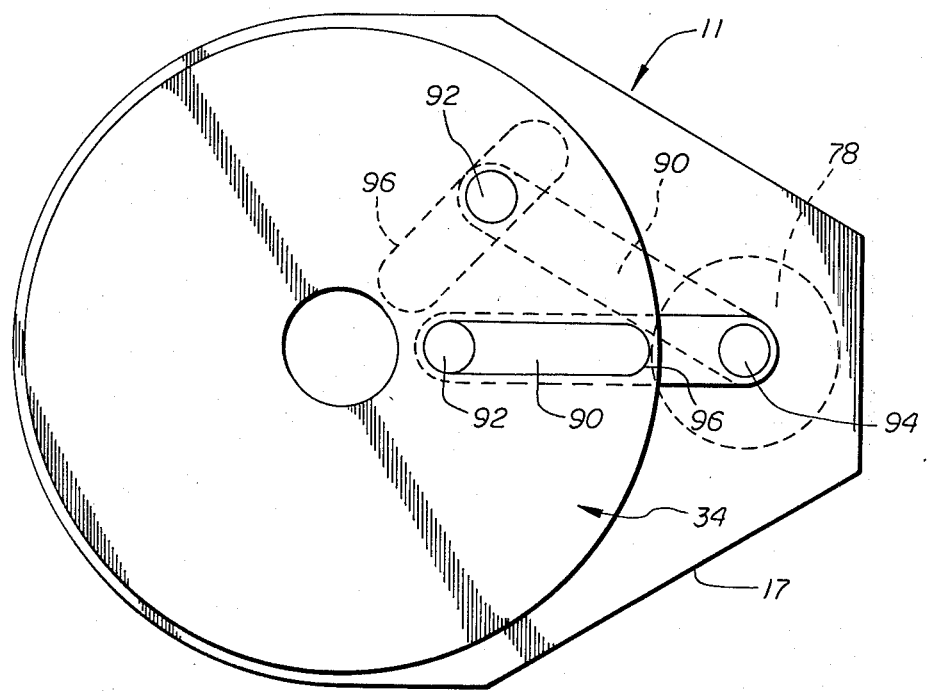
FIG. 8 is a top plan view of one embodiment of the means for engaging and disengaging the pipe-gripping rocker arms of the backup tong.

An alternate embodiment of the means for causing pipe-gripping rocker arms 16 in backup tong 11 to grip the pipe comprises a rotatable arm 90 and roller 92 as shown in FIG. 8. Motive means (not shown) causes arm 90 to roate about the pivot point 94. Roller 92 is attached to the other end of arm 90 and rides in slot 96 of the upper cage plate 34 of the backup tong 11. As arm 90 moves it causes roller 92 to impart rotation to said upper cage plate 34. The annular bull gear 18 of the back-up tong 11 is fixed and stationary in this embodiment since the relative motion between the rocker arms 16 of the annular cage 14 and the camming rollers 20 of the annular bull gear 18 is sufficiently provided by the motion imparted to upper cage plate 34 by arm 90 and roller 92.

The motive means for operating the backup tong may be caused to be automatically activated whenever motor 78 is activated to cause the pipe-rotating power tong to grip the pipe. Alternatively, the backup power tong may be under independent control so that the backup power tong may be used separately if desired.

It is to be noted that the mode of operation of the present invention is completely bi-directional. The description of the operation of the pin and slot arrangement given above for releasing the gripping mechanism following clockwise rotation of the pipe is equally valid for describing the release of the gripping mechanism following counterclockwise rotation of the pipe. Indeed, a major advantage of the present invention is that the mode of operation of the tong as either a clockwise or counterclockwise power tong may be changed simply by manually inserting a motion restraining pin in the appropriate pin hole. This method and apparatus obviates the necessity present in prior art power tongs of manually removing the power tong cover, manually lifting out, turning over and replacing the individual pipe gripping elements and manually replacing the power tong cover to effect a reversal of the direction of rotation of the power tong. As may be seen from the above description and explanation of the present invention, the motion restraining pin an slot assembly serves to cause the released pipe gripping mechanism to stop in the center or open position. The actual bi-directional operation of the power tong is not dependent upon the existence of the pin and slot assembly but is rather a feature of the basic construction of the invention. Operating the present invention without the pin and slot assembly, however, would mean that the operator would have to adjust the inclination of the rocker arms with the controls by trial and error until the rocker arms rotated into the center or open position.

What is claimed is:

1. An improved apparatus for making and breaking connections between lengths of small diameter tubing, comprising:

a pipe-rotating power tong through which the tubing may pass for gripping the tubing and rotating the tubing either clockwise or counterclockwise;

a backup tong through which the tubing may pass for gripping the tubing and holding the pipe firmly against rotational forces acting on the pipe;

means for mounting the pipe-rotating power tong and the backup tong in a desired space relationship with each other wherein the tubing passing through the pipe-rotating power tong and the backup tong is aligned and the pipe-rotating power tong and the backup tong may move longitudinally relative to each other;

the pipe-rotating power tong including:

a housing, an annular cage mounted for rotation within the housing, a plurality of pipe-gripping rocker arm devices pivotally mounted on the annular cage, each of which includes:

a surface facing the pipe to be gripped and which presents complementary gripping teeth, and a surface facing away from pipe to be gripped and which presents complementary camming surfaces, and an annular rotatable bull gear mounted in association with the annular cage and carrying rollers each of which is mounted in association with one of the pivotal pipe-gripping rocker arms mounted on the annular cage, the pipe-gripping rocker arms, the annular cage and the annular rotatable bull gear being constructed such that rotation of the bull gear sufficiently in either direction causes the roller carried by the bull gear to contact one of the camming surfaces on the portion of the pipe-gripping rocker arm device associated therewith and to move the pipe-gripping rocker arm devices such that one of the sets of complementary teeth carried thereon engages the pipe to be gripped;

an endless chain externally engaging the bull gear for rotation thereof;

motive means for driving the endless chain in either the clockwise or counterclockwise direction;

two motion restraining pinholes formed in the bull gear each of which is adapted to receive a motion restraining pin;

an arcuate slot formed in the annular cage of sufficient width to accommodate a motion restraining pin while the pin rests in either of the motion-restraining pin holes;

a restraining pin to be removably inserted in either of the motion-restraining pin holes;

the space between the motion-restraining pin holes and the length and location of the arcuate slot with respect to the motion-restraining pin holes being such that the movement of the bull gear is prevented from exceeding a certain magnitude with respect to the annular cage during the selected rotation of the motive means; and the backup tong including:

a housing;

an annular cage mounted for rotation within the housing;

a plurality of pipe-gripping rocker arm devices pivotally mounted on the annular cage, each of which includes:

a surface facing the pipe to be gripped and which presents complementary gripping teeth, and a surface facing away from pipe to be gripped and which presents complementary camming surfaces; and an annular rotatable bull gear mounted in association with the annular cage and carrying rollers each of which is mounted in association with one of the pivotal pipe-gripping rocker arms mounted on the annular cage;

the pipe-gripping rocker arms, the annular cage and the annular rotatable bull gear being constructed such that rotation of the bull gear sufficiently in either direction causes the roller carried by the bull gear to contact one of the camming surfaces on the portion of the pipe-gripping rocker arm device associated therewith and to move the pipe-gripping rocker arm devices such that one of the sets of complementary teeth carried thereon engages the pipe to be gripped; and motive means for rotating the bull gear in either the clockwise or counterclockwise direction.

2. An improved power tong for gripping and rotating pipe, comprising:

a housing;

an annular cage mounted for rotation within the housing;

a plurality of pipe-gripping rocker arm devices each of which includes:
 a surface facing the pipe to be gripped having mounted on such surface complementary gripping teeth, and
 a surface facing away from pipe to be gripped which presents complementary camming surfaces; and an annular rotatable bull gear mounted in association with the annular cage and carrying internally positioned rollers each of which is mounted in association with one of the pivotal pipe-gripping rocker arms mounted on the annular cage;

the pipe-gripping rocker arms, the annular cage and the annular rotatable bull gear being constructed such that rotation of the bull gear sufficiently in either direction causes the rollers carried by the bull gear to contact one of the camming surfaces on the portion of the pipe-gripping rocker arm devices associated therewith and to move the pipe-gripping rocker arm devices such that one of the sets of complementary teeth carried thereon engages the pipe to be gripped;

motive means rotating the bull gear in either the clockwise or counterclockwise direction;

two motion restraining pinholes formed in the bull gear each of which is adapted to receive a motion restraining pin;

an arcuate slot formed in the annular cage of sufficient width to accommodate a motion restraining pin while the pin rests in either of the motion-restraining pin holes;

a restraining pin to be removably inserted in either of the motion-restraining pin holes; and the space between the motion-restraining pin holes and the length and location of the arcuate slot with respect to the motion-restraining pin holes being such that the movement of the bull gear is prevented from exceeding a certain magnitude with respect to the annular cage during the selected rotation of the motive means.

* * * * *